(12) United States Patent
Parler, Jr. et al.

(10) Patent No.: US 12,283,425 B2
(45) Date of Patent: Apr. 22, 2025

(54) CAPACITOR ASSEMBLY

(71) Applicant: Cornell Dubilier, LLC, Itasca, IL (US)

(72) Inventors: Samuel Graham Parler, Jr., Clemson, SC (US); Paul Mathew Jan Jorissen, Jr., South Dartmouth, MA (US); Brian Lowell Padelford, New Bedford, MA (US)

(73) Assignee: Cornell Dubilier, LLC, Itasca, IL (US)

( * ) Notice: Subject to any disclaimer, the term of this patent is extended or adjusted under 35 U.S.C. 154(b) by 176 days.

(21) Appl. No.: 17/745,334

(22) Filed: May 16, 2022

(65) Prior Publication Data
US 2023/0016672 A1    Jan. 19, 2023

Related U.S. Application Data

(60) Provisional application No. 63/219,704, filed on Jul. 8, 2021.

(51) Int. Cl.
*H01G 2/02* (2006.01)
*H01G 4/32* (2006.01)
*H01G 4/38* (2006.01)

(52) U.S. Cl.
CPC ............. *H01G 2/02* (2013.01); *H01G 4/38* (2013.01); *H01G 4/32* (2013.01)

(58) Field of Classification Search
CPC .. H01G 2/02; H01G 4/38; H01G 4/32; H01G 2/106
(Continued)

(56) References Cited

U.S. PATENT DOCUMENTS

| 2,846,627 | A | * | 8/1958 | Doughty, Jr. | ............ H01G 4/38 |
| | | | | | 361/275.1 |
| 2,891,204 | A | * | 6/1959 | Kuhn | ....................... H01G 4/32 |
| | | | | | 361/309 |

(Continued)

FOREIGN PATENT DOCUMENTS

| DE | 202018106621 U1 * | 4/2019 | ............... H01G 2/02 |
| DE | 102018103166 A1 * | 6/2019 | ............... H01G 2/02 |
| EP | 1654744 B1 | 5/2007 | |

OTHER PUBLICATIONS

J. Schnack, S. Brückner, H. Süncksen, U. Schümann and R. Mallwitz, "Analysis and Optimization of Electrolytic Capacitor Technology for High-Frequency Integrated Inverter," in IEEE Transactions on Components, Packaging and Manufacturing Technology, vol. 11, No. 6, pp. 999-1011, Jun. 2021 (Year: 2021).*

(Continued)

*Primary Examiner* — Thienvu V Tran
*Assistant Examiner* — Sreeya Sreevatsa
(74) *Attorney, Agent, or Firm* — Hickman Becker Bingham Ledesma LLP; Matthew C. Loppnow

(57) ABSTRACT

A capacitor assembly comprises a plurality of capacitor elements (e.g., four or more capacitor elements) each having a first end surface and a second end surface defining a first polarity terminal and a second polarity terminal, respectively. The plurality of capacitor elements are arranged in at least one stacked pair with a first polarity terminal of a first capacitor element in each stacked pair being opposed to a first polarity terminal of a second capacitor element in such stacked pair. The plurality of capacitor elements in this aspect are contained in a housing. A first polarity bus bar and a second polarity bus bar are electrically connected to the plurality of capacitor elements. The plurality of capacitor elements may be connected in parallel.

25 Claims, 5 Drawing Sheets

(58) Field of Classification Search
USPC .......................................................... 361/39
See application file for complete search history.

(56) References Cited

U.S. PATENT DOCUMENTS

| | | | |
|---|---|---|---|
| 3,300,695 | A | 1/1967 | Cypra et al. |
| 3,506,936 | A | 4/1970 | Loos et al. |
| 4,547,832 | A | 10/1985 | Lavene |
| 5,075,815 | A | 12/1991 | Price |
| 5,132,896 | A | 7/1992 | Nishizawa et al. |
| 6,498,713 | B2 | 12/2002 | Sanger et al. |
| 6,894,886 | B2 | 5/2005 | Eriksson et al. |
| 7,190,565 | B1 | 3/2007 | Marantz |
| 7,218,504 | B2 | 5/2007 | Steyskal et al. |
| 7,427,851 | B2 | 9/2008 | Takemoto et al. |
| 8,411,454 | B2 | 4/2013 | Azuma et al. |
| 8,760,847 | B2 | 6/2014 | Dooley et al. |
| 8,780,525 | B2 | 7/2014 | Yoda et al. |
| 2009/0040685 | A1 | 2/2009 | Hiemer et al. |
| 2010/0321859 | A1 | 12/2010 | Hosking |
| 2012/0229948 | A1 | 9/2012 | Sawyer et al. |
| 2012/0229977 | A1 | 9/2012 | Hosking et al. |
| 2014/0063688 | A1 | 3/2014 | Sasaki |
| 2015/0255216 | A1 | 9/2015 | Mishra et al. |
| 2016/0217932 | A1 | 7/2016 | Wang |
| 2016/0314903 | A1 | 10/2016 | Danov et al. |
| 2017/0207028 | A1 | 7/2017 | Martinez et al. |
| 2019/0080850 | A1 | 3/2019 | Inazumi |
| 2019/0180942 | A1 | 6/2019 | Daneels et al. |
| 2019/0287722 | A1 | 9/2019 | Singh et al. |
| 2020/0195189 | A1* | 6/2020 | Kitamura ................ B60L 50/51 |
| 2020/0275580 | A1* | 8/2020 | Wang ...................... H02G 5/02 |
| 2020/0328032 | A1* | 10/2020 | Gomez ............... H02G 3/0608 |

OTHER PUBLICATIONS

International Search Report and Written Opinion for corresponding International application No. PCT/US2022/029558 dated Nov. 10, 2022; 21 pages.

Kobayashi, International Preliminary Report On Patentability, International application No. PCT/US2022/029558, The International Bureau of WIPO, Geneva, Switzerland, Dec. 14, 2023.

* cited by examiner

CAPACITOR ASSEMBLY

PRIORITY CLAIM

This application is based upon and claims the benefit of U.S. provisional application Ser. No. 63/219,704, filed Jul. 8, 2021, which is incorporated fully herein by reference for all purposes.

FIELD OF THE INVENTION

Embodiments of the present invention relate to capacitor assemblies having a plurality of capacitor elements. More particularly, embodiments of the present invention relate to such a capacitor assembly that exhibits smooth and well-behaved impedance and ESR above its self-resonant frequency.

BACKGROUND OF THE INVENTION

It is often desirable to reduce the ESR (equivalent series resistance) of a capacitor assembly formed of multiple capacitor elements fed by a bus structure. For example, the usual approach to layout of a capacitive bus structure in high frequency applications is to bring the terminals to two parallel conductor plates separated by a thin dielectric. To handle the highest power and highest AC current at high frequencies, the capacitor elements are conventionally designed with low ESR and are each connected to the common, main plates in a manner that has as low of a series inductance as possible.

According to one example of the conventional approach, each element may be connected with wide tabs that enclose minimal area. According to another example of the conventional approach, each element may be connected with one terminal directly to one of the main foils and the other terminal connected by an enclosing foil shroud around the rest of the element, contacting the other main foil.

Another conventional strategy for bus layout is to arrange low-capacitance elements nearest the terminals of the structure, where the main AC current enters the bus structure, and to locate the high-capacitance elements further away. The goal of such an arrangement is to present to the input terminals a sequential range of impedances versus frequency.

While these conventional strategies have proved generally effective in some applications, other applications present special challenges that make the conventional strategies less effective. For example, a power filter capacitor used in electric vehicle charging stations might be required to sustain high frequency ripple currents at significant amperage levels. In one known application, a capacitor unit rated at 300 µF and 1000 VDC may be required to handle 50-100 amps ripple current in a spectral range of 50 to 600 kHz. A capacitor assembly meeting such parameters will inevitably pass through the self-resonant frequency. As a result, supernumerary resonances and circulating currents could cause excessive heating.

SUMMARY OF THE INVENTION

The present invention recognizes and addresses the foregoing considerations, and others, of prior art constructions and methods.

One aspect of the present invention provides a capacitor assembly comprising a plurality of capacitor elements (e.g., two or more capacitor elements) each having a first end surface and a second end surface defining a first polarity terminal and a second polarity terminal, respectively. The plurality of capacitor elements are arranged in at least one stacked pair with a first polarity terminal of a first capacitor element in each stacked pair being opposed to a first polarity terminal of a second capacitor element in such stacked pair. The plurality of capacitor elements in this aspect are contained in a housing. A first polarity bus bar and a second polarity bus bar are electrically connected to the plurality of capacitor elements (such as connected so that the capacitor elements are in parallel). In a preferred embodiment, the capacitor assembly may have a total capacitance falling in a range of 50 µF to 5000 µF, 100 µF to 1000 µF, or 200 µF to 500 µF.

According to some exemplary embodiments, a first stacked pair of capacitor elements and a second stacked pair of capacitor elements are oriented along an axis, with the bus bars being located beside an intermediate location where the first stacked pair and the second stacked pair are adjacent to each other. Preferably, conductors interconnecting the capacitor elements and the bus bars extend laterally from the intermediate location to the bus bars. A first conductive shield may cover at least a portion of a side surface of each capacitor element, the first conductive shield being electrically connected to the first polarity terminal. A second conductive shield may cover at least a portion of the side surface of each capacitor element, the second conductive shield being electrically connected to the second polarity terminal. The first conductive shield and the second conductive shield may overlap. In addition, the first conductive shield and the second conductive shield may have an annular main portion from which at least one orthogonal tab extends, the orthogonal tab being adhered to an associated one of the first end surface and the second end surface. For example, the at least one orthogonal tab may comprise a plurality of spaced apart orthogonal tabs.

Another aspect of the present invention provides a capacitor assembly comprising a plurality of capacitor elements each having a first end surface and a second end surface defining a first polarity terminal and a second polarity terminal, respectively. A housing in which the plurality of capacitor elements are contained is also provided. A first polarity bus bar and a second polarity bus bar are electrically connected to the plurality of capacitor elements. A first stacked pair of capacitor elements and a second stacked pair of capacitor elements are oriented along an axis, with the bus bars being located beside an intermediate location where the first stacked pair and second stacked pair are adjacent to each other. In addition, conductors interconnecting the capacitor elements and the bus bars may extend laterally from the intermediate location to the bus bars.

A still further aspect of the present invention provides a capacitor assembly comprising a plurality of capacitor elements arranged in at least one stacked pair, each of the capacitor elements having a first end surface and a second end surface defining a first polarity terminal and a second polarity terminal, respectively. A respective first conductive shield covers at least a portion of a side surface of each capacitor element, the first conductive shield being electrically connected to the first polarity terminal. A respective second conductive shield covers at least a portion of the side surface of each capacitor element, the second conductive shield being electrically connected to the second polarity terminal. A first polarity bus bar and a second polarity bus bar are electrically connected to the plurality of capacitor elements.

A still further aspect of the present invention provides a capacitor element comprising a first polarity plate and a second polarity plate located on metalized film wound to have an annular structure. A first polarity terminal is located on a first end of the annular structure, the first polarity terminal being electrically connected to the first polarity plate. A second polarity terminal is located on a second end of the annular structure, the second polarity terminal being electrically connected to the second polarity plate. A first conductive shield covers at least a portion of a side surface of the annular structure, the first conductive shield being electrically connected to the first polarity terminal. A second conductive shield also covers at least a portion of the side surface of the annular structure, the second conductive shield being electrically connected to the second polarity terminal. The first conductive shield and the second conductive shield each have a main portion from which at least one orthogonal tab extends, the orthogonal tab being adhered to an associated one of the first polarity terminal and the second polarity terminal.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
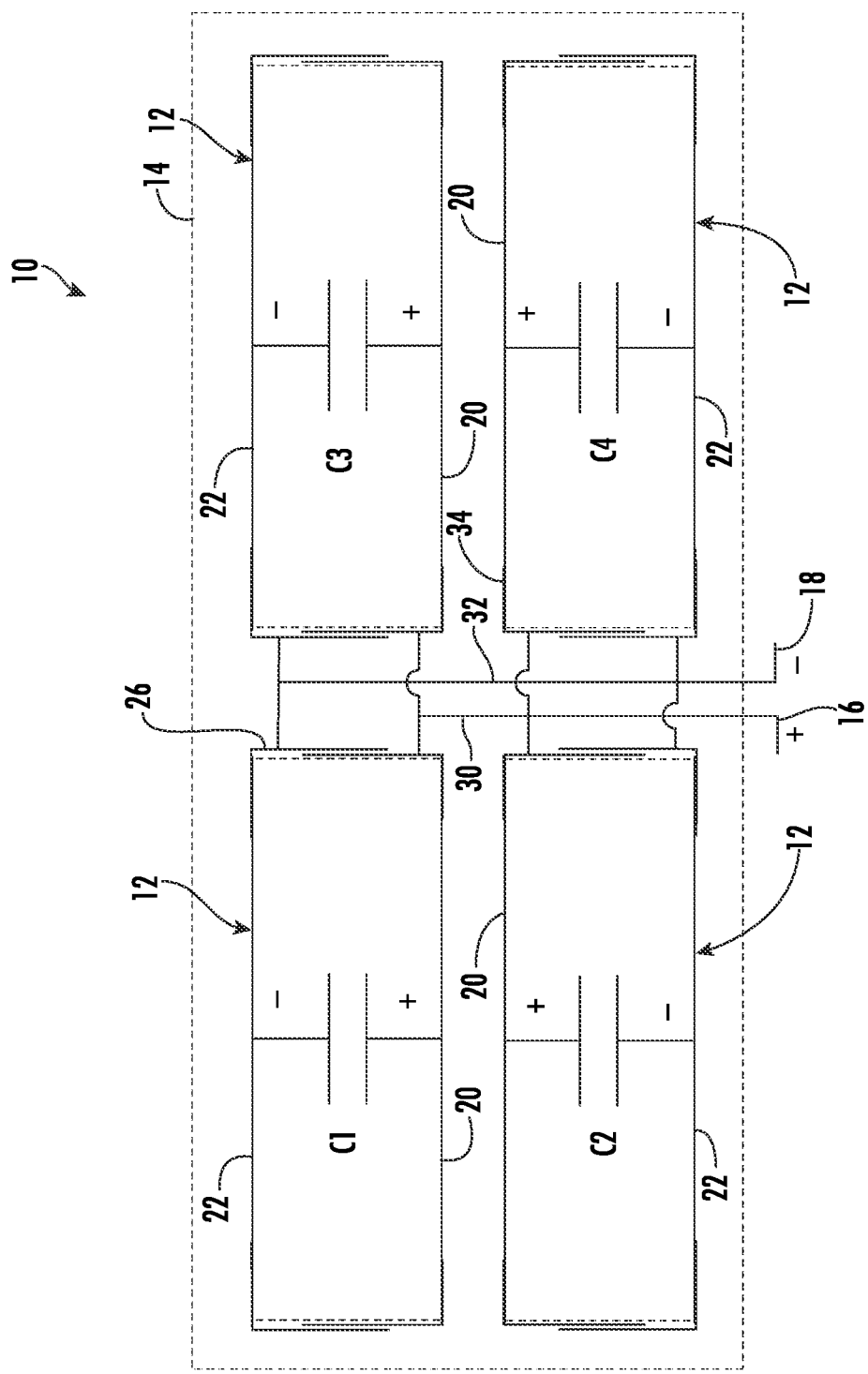
FIG. 1 is a schematic of a capacitor assembly in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a capacitor assembly 10 constructed in accordance with an embodiment of the present invention. Assembly 10 includes a plurality of capacitor elements 12 contained within a suitable housing 14. In this case, four such capacitor elements 12 are provided, also labeled C1-C4. Capacitor elements 12 may be connected in parallel, as shown, such that the total capacitance of capacitor assembly 10 is the sum of the individual capacitor elements 12.

Each of the capacitor elements 12 has a first polarity terminal and a second polarity terminal (labeled "+" and "−"), which are connected in circuit with external circuitry via a pair of bus bars 16 and 18 which extend outside of housing 14. One or more pairs of capacitor elements 12 are preferably stacked with one of the like terminals of each capacitor element in the pair being opposed to one another. As shown, for example, respective + terminals 20 of capacitor elements C1 and C2 are adjacent and opposed to one another. Similarly, respective + terminals 20 of capacitor elements C3 and C4 are adjacent and opposed to one another. The respective − terminals 22 therefore form end faces of each stack. While the illustrated embodiment has two stacked pairs of capacitor elements, other embodiments are contemplated having one stacked pair or at least three stacked pairs.

Figure 2:
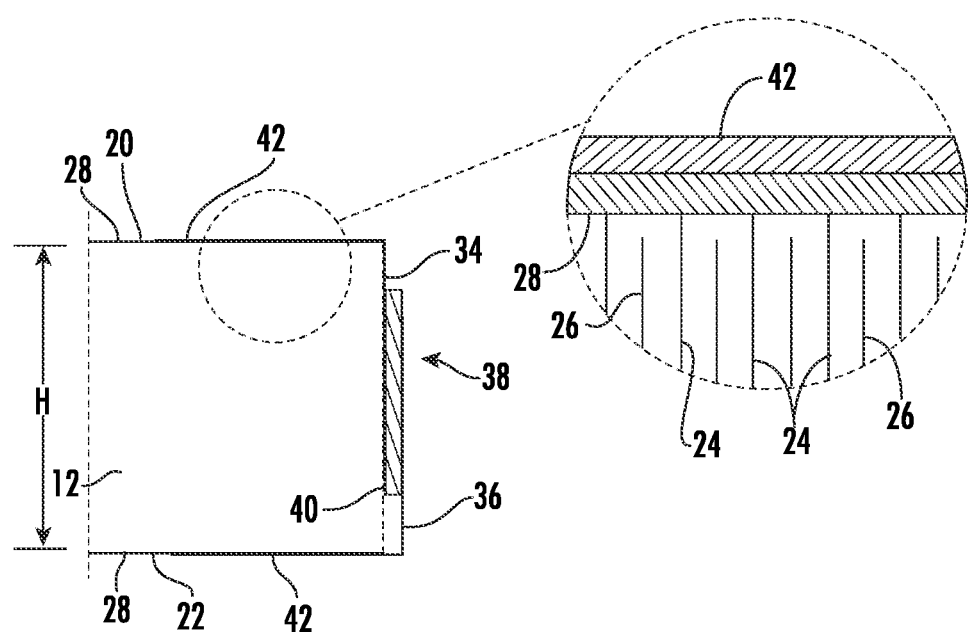
FIG. 2 is an enlarged diagrammatic view of a portion of one of the capacitor elements of the capacitor assembly of FIG. 1, with a portion thereof further enlarged to show additional detail.

Referring now also to FIG. 2, certain additional details regarding capacitor elements 12 can be most easily explained. In this embodiment, capacitor elements 12 each have an annular structure (similar to the shape of a hockey puck) formed from wound metalized sheets. Specifically, the capacitor plates are formed from two dielectric sheets having first polarity metallization and second polarity metallization, respectively, on one side. The metallization extends to one edge of the sheet such that the first polarity metallization 24 extends to the first polarity terminal 20 and the second polarity metallization 26 extends to the second polarity terminal 22. Metallization 28 is then applied to the ends of the puck-like structure to electrically connect all of the like-polarity plates and form the respective terminal. For example, metallization 28 may be applied as sprayed zinc on the ends of the puck-like structure. Preferably, each of the capacitor elements 12 has a height H which is less than its diameter (or width in the case of a rectangular capacitor element).

Bus bars 16 and 18 connect to internal conductors 30 and 32 (FIG. 1) of the respective capacitor elements. As shown, the conductors 30 and 32 preferably extend between the stacked pairs C1-C2 and C3-C4 such that there is 3D spatial symmetry in the current flow in and out of the capacitor pairs. Advantageously, the connection between the internal conductors 30 and 32 and the respective terminals 20 and 22 is provided by conductive shields 34 and 36 located on each of the capacitor elements 12. Shields 34 and 36 preferably extend annularly around the sides of the capacitor elements 12 such that they preferably overlap (indicated at 38 in FIG. 2). As a result, the side of the puck-like structure of each capacitor element 12 is entirely shielded. In this case, a sheet-like insulator 40 is positioned between shields 34 and 36 to prevent shorting. Shields 34 and 36 include suitable structures, such as tabs 42, which connect the annular portion of shields 34 and 36 to the end terminals 20 and 22.

Preferably, tabs 42 are suitably and conductively adhered to the end terminals of the capacitor elements 12, such as by soldering.

Figure 3:
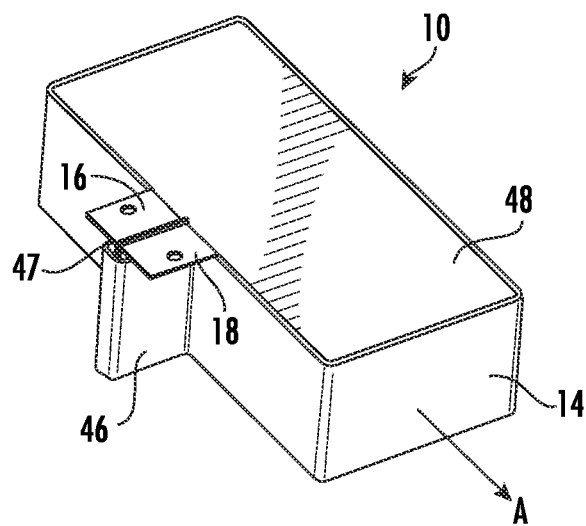
FIG. 3 is a perspective view of a capacitor assembly constructed in accordance with an embodiment of the present invention.
Figure 4:
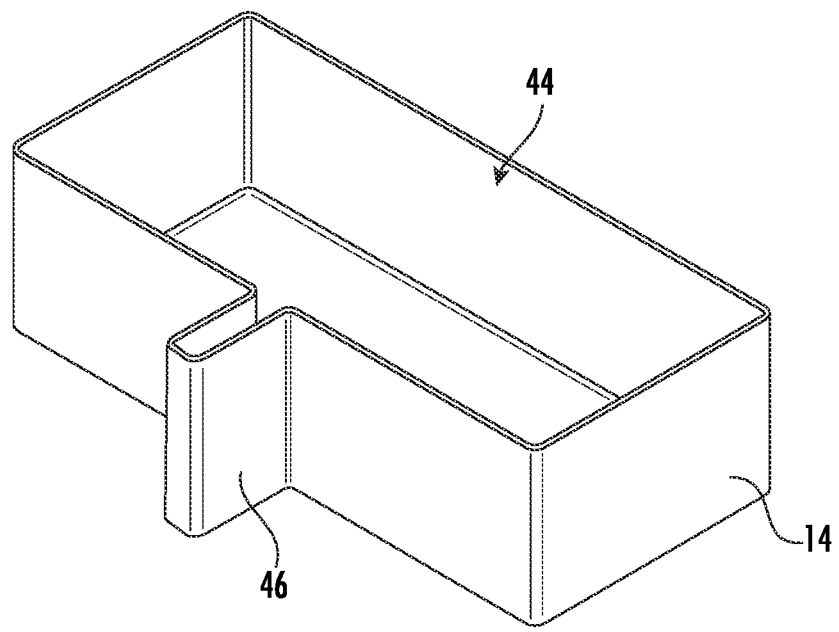
FIG. 4 illustrates a container of the capacitor assembly of FIG. 3.

Referring now to FIGS. 3 and 4, housing 14 in this embodiment includes an open container having an interior volume 44 in which the capacitor elements are contained. The bus bars 16 and 18 are seated in a small lateral portion 46 that extends from the interior volume 44 of the housing 14 midway along its length. Bus bars 16 and 18 may be formed, for example, as L-shaped copper members oriented back-to-back with respect to each other. It will be appreciated that a sheet-like insulator 47 is positioned between the adjacent portions of bus bars 16 and 18 to prevent shorting. The "tops" of bus bars 16 and 18 may define one or more apertures, as shown, for connection of external circuitry. As indicated at 48, a potting compound, such as a suitable epoxy, may fill the remainder of the interior volume 44 of the container that is not occupied by capacitor elements 12 and the other internal components of capacitor assembly 10.

In many embodiments, the interior volume 44 may be no more than 2.5 liters, such as about 2.0 liters. Toward this end, housing 14 may, for example, have dimensions of no greater than 10 inches by 4 inches by 2.75 inches (not including lateral portion 46). The rectangular shape defines an axis A along which the stacked pairs of capacitor elements are arranged side-by-side. As can be seen, bus bars 16 and 18 are in this case located beside a midpoint of the axis A where a first stacked pair and a second stacked pair are adjacent. Conductors between the capacitor elements and the bus bars extend laterally from the axis A to the bus bars, providing a high degree of symmetry to the overall configuration.

While the housing includes a rigid box in the illustrated embodiment, the term "housing" as used herein is not limited to a housing that includes a box-like container. For example, the stacked capacitor elements may be encased in an epoxy or other viscous material that is subsequently hardened. Alternatively, the stacked capacitor elements may be encased in an insulative shrink wrap. These and similar alternatives are also housings.

Figure 5:
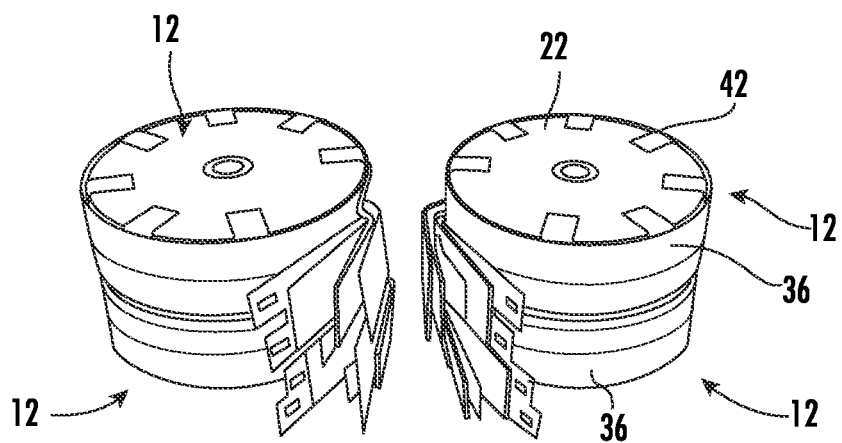
FIG. 5 is a perspective view showing capacitor elements of the capacitor assembly of FIG. 3.

FIG. 5 illustrates capacitor elements 12 stacked outside of housing 14 with their + terminals 20 oriented toward one another as described above. As can also be easily seen, tabs 42 of shields 36 are adhered to the metallization of terminal 22. Similarly, tabs 42 of shields 34 are adhered to the metallization of terminal 20.

Figure 6:
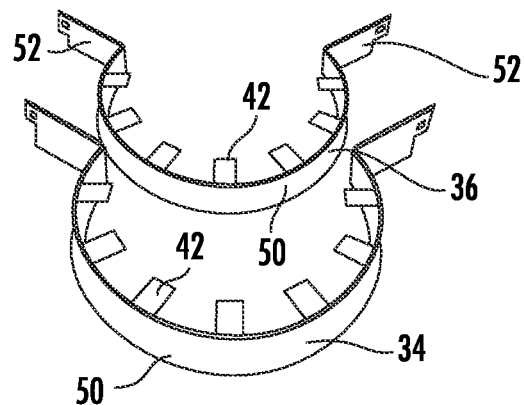
FIG. 6 shows conductive shields for use in the capacitor assembly of FIG. 3.

As shown in FIG. 6, shields 34 and 36 may be made from thin sheet metal, such as copper, cut and formed into the desired configuration. The annular main portion 50 of shields 34 and 36 is wrapped around the puck-like structure of a respective capacitor element 12 and held until tabs 42 are adhered. As shown, a plurality of tabs 42 are spaced apart in this embodiment around the annular main portion 50 of shields 34 and 36. Tabs 42 extend orthogonally for attachment to the end terminals of the capacitor elements. Shields 34 and 36 further include extensions 52 in this embodiment, which form the conductors 30 and 32.

Figure 7:
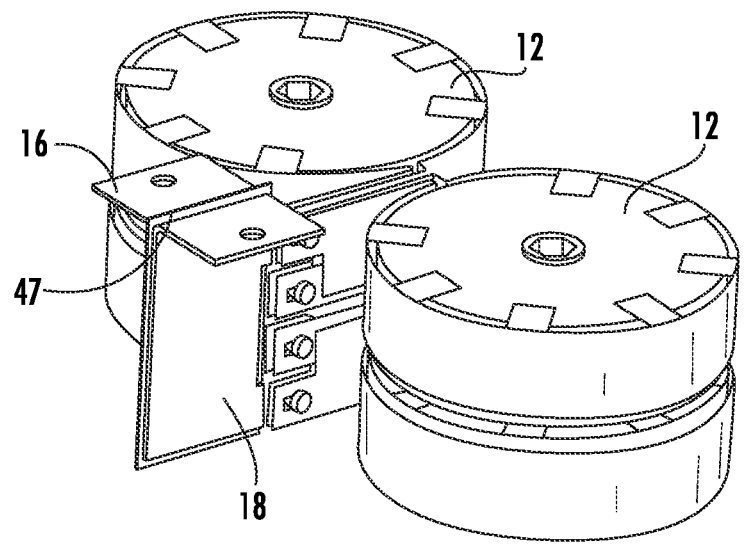
FIG. 7 is a perspective view showing capacitor elements of the capacitor assembly of FIG. 3 connected to bus bars.

FIG. 7 also illustrates components of capacitor assembly 10 outside of housing 14 but connected to bus bars 16 and 18. It will be appreciated that these components will fit neatly into the interior volume 44 of housing 14, thus providing a compact "package" for the overall capacitor assembly 10 (e.g., 2.5 liters or less as noted above). An insulative sheet is provided between extensions 52 of shields 34 and 36 as necessary to prevent shorting.

Figure 8:
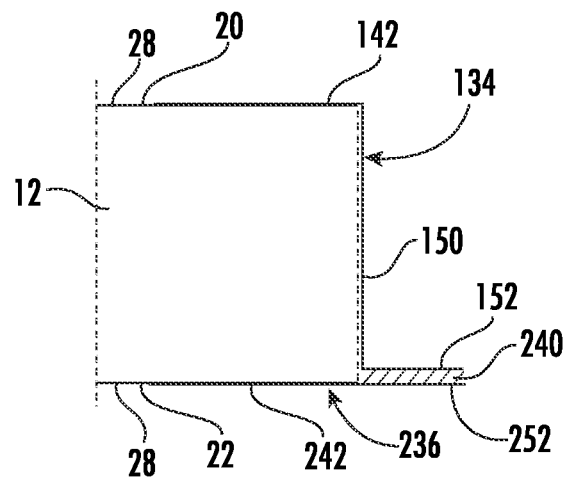
FIG. 8 is an enlarged diagrammatic view similar to FIG. 2 of a portion of a capacitor element of an alternative embodiment.

FIG. 8 illustrates an alternative embodiment in which a conductive shield 134 has annular main portion 150 that substantially covers the entire side of the puck-like structure of a capacitor element 12. Like the previous embodiment, shield 134 includes suitable structures, such as tabs 142, which connect the annular main portion 150 to the end terminals 20 or 22. Also, like the previous embodiment, tabs 142 are suitably and conductively adhered to the end terminals of the capacitor element 12, such as by soldering. Extension 152 provides electrical communication to the respective one of bus bars 16 or 18.

A second conductor 236 has one or more tabs 242 connected to the other terminal of capacitor element 12 and an extension 252 for providing electrical communication to the respective one of bus bars 16 or 18. A sheet-like insulator 240 is positioned between extensions 152 and 252 to prevent shorting.

While the various shields of the capacitor assembly may be formed of conductive foil as described above, embodiments are contemplated in which the shields are formed in other ways, such as, for example, zinc (or other alloy) end spray coating of the windings.

EXAMPLE

A capacitor assembly 10 was made having four 88 µF wound film capacitor elements connected together to yield a total capacitance of 355 µF. The film thickness of the wound film was 4.8 µm. The capacitor was rated no less than 1000 VDC. The capacitor was tested for ESR and impedance across a wide frequency spectrum. Results are as follows:

| F (kHz) | Arms | A²rms | Sweep#1 ESR (mΩ) | Sweep#1 P(W) | Sweep#2 ESR (mΩ) | Sweep#2 P(W) |
|---|---|---|---|---|---|---|
| 50 | 30 | 900 | 0.593 | 0.534 | 0.623 | 0.560 |
| 100 | 20 | 400 | 0.724 | 0.290 | 0.742 | 0.297 |
| 120 | 20 | 400 | 0.776 | 0.310 | 0.801 | 0.320 |
| 200 | 60 | 3600 | 0.967 | 3.479 | 0.992 | 3.571 |
| 220 | 20 | 400 | 1.037 | 0.415 | 1.049 | 0.420 |
| 320 | 40 | 1600 | 1.224 | 1.958 | 1.233 | 1.973 |
| 420 | 40 | 1600 | 1.445 | 2.312 | 1.452 | 2.323 |
| 540 | 10 | 100 | 2.049 | 0.205 | 2.047 | 0.205 |
| | | ΣIrms² = 8100 | | ΣP (W) = 9.5 | | ΣP (W) = 9.67 |
| Irms Total = 90 | | C(µF), 1 kHz = | 354.6 | | 354.6 | |
| | | $F_{RES}$ (kHz) | 116 | | 118 | |
| | | ESL (nH) | 5.3 | | 5.1 | |

Figure 9:
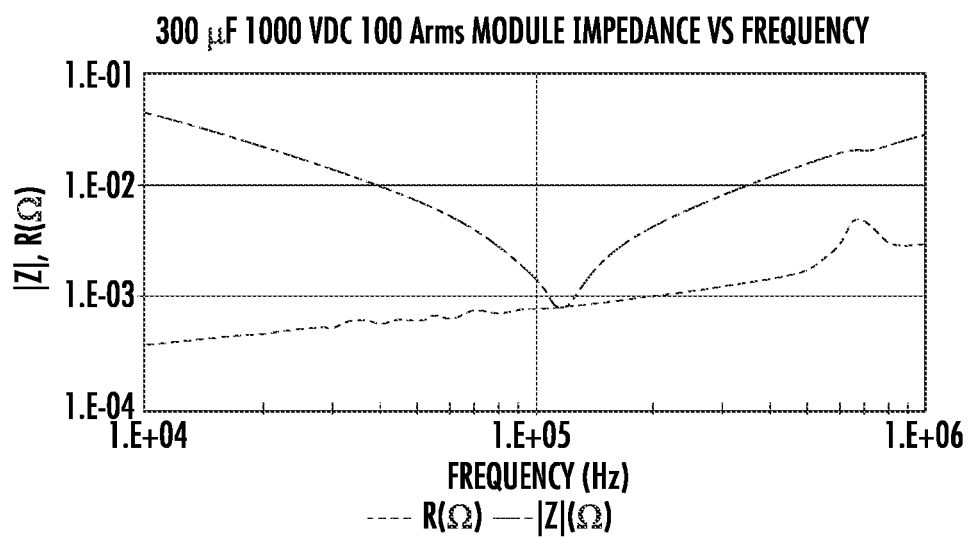
FIG. 9 is a graph showing impedance and ESR curves for an example embodiment.

It will be appreciated that the power dissipation across the desired frequency spectrum is very low, and little heating will result despite the self-resonant frequency falling inside of that spectrum. As can be seen in FIG. 9, the impedance and ESR curves are also very smooth.

Capacitors in accordance with the present invention desirably achieve input impedance magnitudes below 15 mΩ and ESR below 1.8 mΩ across a frequency spectrum of 50 kHz to 500 kHz (or more) for capacitances in a range of 200 µF to 400 µF, despite the inevitable inductance and ESR contributed by the bus bars. These results are related to the symmetrical arrangement of the capacitor elements and the shielding as described above. In addition, foil shielding is believed to enhance heat dissipation and lower thermal resistance.

It can thus be seen that the present invention provides a novel capacitor assembly. Thus, while one or more preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

What is claimed is:

1. A capacitor assembly comprising:
a plurality of capacitor elements each having a first polarity terminal at a first end and a second polarity terminal at a second end opposite the first end, the first and second ends of each capacitor element separated by a side of a corresponding capacitor element, the plurality of capacitor elements arranged in a first stacked pair and a second stacked pair;
a first conductive shield at least partially covering sides of each stacked pair and electrically connected to the first polarity terminals of the corresponding stacked pair;
a second conductive shield at least partially overlapping the first conductive shield of each stacked pair and electrically connected to the second polarity terminals of the corresponding stacked pair, the first conductive shield electrically isolated from the second conductive shield;
a first conductor connected to the first conductive shields and located between sides of the first and second stacked pairs, and a second conductor connected to the second conductive shields and located between the sides of the first and second stacked pairs, the first conductor adjacent to, and electrically isolated from, the second conductor; and
a first polarity bus bar electrically connected to the first conductive shield by the first conductor, and a second polarity bus bar electrically connected to the second conductive shield by the second conductor,
wherein the first and second ends of the first stacked pair are stacked along a first axial dimension, and the first and second ends of the second stacked pair are stacked along a second axial dimension parallel to the first axial dimension, and
wherein first and second capacitor elements of each stacked pair re arranged so that the first polarity terminal of the first capacitor element faces the first polarity terminal of the second capacitor element.

2. The capacitor assembly as set forth in claim 1, wherein the first and second conductors are symmetrically located between the first and second stacked pairs.

3. The capacitor assembly as set forth in claim 2, wherein the first conductor comprises an extension of the first conductive shield, and the second conductor comprises an extension of the second conductive shield.

4. The capacitor assembly as set forth in claim 1, wherein
each first conductive shield comprises first and second shield portions each covering the side of a corresponding capacitor element of the first and second stacked pairs, each of the first conductive shield portion comprises a tab electrically connected to the first polarity terminal of the corresponding capacitor element,
each of the second conductive shield comprises one or more tabs electrically connected to each second polarity terminal of the corresponding first and second capacitor elements,
wherein the first and second capacitor elements of the first and second stacked pairs are electrically connected in parallel.

5. The capacitor assembly as set forth in claim 4, wherein the first conductor comprises an extension of each of the first and second conductive shield portions, and the second conductor comprises an extension of the second conductive shield.

6. The capacitor assembly as set forth in claim 1, wherein each of the first and second conductive shields comprises a main portion from which one or more bent tabs extend, bent tabs of the first conductive shield electrically connected to corresponding first polarity terminals of the first stacked pair, and bent tabs of the second conductive shield electrically connected to corresponding second polarity terminals of the second stacked pair.

7. The capacitor assembly as set forth in claim 6, wherein the one or more bent tabs of each conductive shield are orthogonal to the main portion of the corresponding conductive shield.

8. The capacitor assembly as set forth in claim 1, wherein the plurality of capacitor elements constitutes not more than first and second stacks of capacitor elements.

9. The capacitor assembly as set forth in claim 8, wherein each of the plurality of capacitor elements has a wound configuration comprising a metalized film, and the first end of each capacitor element corresponds to the first polarity terminal and the second end of each capacitor element corresponds to the second polarity terminal.

10. The capacitor assembly as set forth in claim 1, wherein the plurality of capacitor elements are connected in parallel.

11. The capacitor assembly as set forth in claim 1, wherein the capacitor assembly has a total capacitance falling in a range of 50 µF to 5000 µF.

12. The capacitor assembly as set forth in claim 1, wherein the capacitor assembly has a total capacitance falling in a range of 100 µF to 1000 µF.

13. The capacitor assembly as set forth in claim 1, wherein the capacitor assembly has a total capacitance falling in a range of 200 µF to 500 µF.

14. A capacitor assembly comprising:
a plurality of capacitor elements, each capacitor element comprising a side surface extending from a first polarity end surface to a second polarity end surface opposite the first polarity end surface,
a first stacked pair of capacitor elements arranged so that the first polarity end surface of a first capacitor element faces the first polarity end surface of a second capacitor element of the first stacked pair,
a second stacked pair of capacitor elements arranged so that the first polarity end surface of a first capacitor element faces the first polarity end surface of a second capacitor element of the second stacked pair,
the capacitor elements of the first and second stacked pair electrically connected in parallel;
a housing containing the first stacked pair beside the second stacked pair;
a first conductive shield at least partially covering the side surface of each stacked pair and electrically connected to the first polarity end surfaces of a corresponding stacked pair;
a second conductive shield at least partially overlapping the first conductive shield of each stacked pair and electrically connected to the second polarity end surfaces of the corresponding stacked pair, each first conductive shield electrically isolated from the overlapping second conductive shield;
a first polarity bus bar located in the housing and comprising a first terminal accessible at an exterior of the housing, and a second polarity bus bar located in the housing and comprising a second terminal accessible at an exterior of the housing; and a first conductor located in the housing between the side surfaces of the first and second stacked pairs and electrically connecting the first conductive shields of the first and second stacked pairs to the first polarity bus bar, and a second conductor located in the housing between the side surfaces of the first and second stacked pairs and electrically connecting the second conductive shields of the first and second stacked pairs to the second polarity bus bar, the first conductor adjacent to, and electrically isolated from, the second conductor.

15. The capacitor assembly as set forth in claim 14, wherein the first and second conductors and the first and second polarity bus bars are arranged symmetrically relative to the first and second stacked pairs.

16. The capacitor assembly as set forth in claim 15, wherein each first conductive shield comprises a first shield portion at least partially covering the side surface of a first capacitor element of a corresponding stacked pair, and a second shield portion at least partially covering a side surface of a second capacitor element of a corresponding stacked pair, each shield portion of the first conductive shield comprises a corresponding bent tab electrically connected to the first polarity end surface of the corresponding capacitor element, and each second conductive shield comprises bent tabs electrically connected to the second polarity end surfaces of the corresponding stacked pair.

17. The capacitor assembly as set forth in claim 16, wherein each capacitor element comprises:

first and second polarity metallized surfaces separated by a dielectric sheet wound to have an annular structure, wherein the first terminal comprises a first conductive cover located on a first end of the annular structure and electrically connected to the first polarity metallized surface, the second polarity metalized surface spaced apart from the first conductive cover, and the second terminal comprises a second conductive cover located on a second end of the annular structure and electrically connected to the second polarity metallized surface, the first polarity metalized surface spaced apart from the second conductive cover.

18. A capacitor assembly comprising:

a plurality of capacitor elements arranged in at least one stacked pair, each of the capacitor elements having a side surface separating a first end surface and a second end surface, the first end surface comprising a first polarity terminal and the second end surface comprising a second polarity terminal, the first and second end surfaces of the at least one stacked pair stacked along a common axial dimension and oriented so that the first polarity terminals of the first and second stacked pairs face each other;

a first conductive shield covering at least a portion of the side surface of the at least one stacked pair, the first conductive shield electrically connected to the first polarity terminals of the at least one stacked pair;

a second conductive shield at least partially overlapping the first conductive shield, the second conductive shield electrically connected to the second polarity terminals of the at least one stacked pair, the first conductive shield electrically isolated from the second conductive shield, wherein first and second capacitor elements of the at least one stacked pair are connected in parallel by the first and second conductive shields.

19. The capacitor assembly as set forth in claim 18, wherein the first conductive shield comprises a first shield portion at least partially covering the side surface of the first capacitor element of the at least one stacked pair, and a second shield portion at least partially covering the side surface of the second capacitor element of the at least one stacked pair, each shield portion of the first conductive shield electrically connected to the first polarity terminal of a corresponding capacitor element.

20. The capacitor assembly as set forth in claim 19, wherein each shield portion of the first conductive shield comprises a bent tab electrically connected to the first polarity terminal of the corresponding capacitor element, and the second conductive shield comprises bent tabs electrically connected to the second polarity terminals of the at least one stacked pair.

21. The capacitor assembly as set forth in claim 20, wherein each bent tab comprises a plurality of spaced apart tabs orthogonal to a side portion of the corresponding conductive shield.

22. The capacitor assembly as set forth in claim 18, wherein each capacitor element comprises first and second polarity metallized surfaces separated by a dielectric that has a wound structure, wherein the first polarity terminal comprises a first conductive cover located on a first end of the wound structure and electrically connected to the first polarity metallized surface, the second polarity metalized surface spaced apart from the first conductive cover, and the second polarity terminal comprises a second conductive cover located on a second end, opposite the first end, of the wound structure and electrically connected to the second polarity metallized surface, the first polarity metalized surface spaced apart from the second conductive cover.

23. The capacitor assembly as set forth in claim 18 further comprising a first polarity bus bar electrically connected to the first conductive shield by a first conductor located at a side of the at least one stacked pair, and a second polarity bus bar electrically connected to the second conductive shield by a second conductor located at the side of the at least one stacked pair, wherein the first polarity bus bar is adjacent to, and electrically isolated from, the second polarity bus bar.

24. A capacitor element comprising:

a first polarity metallized surface and a second polarity metallized surface separated by a dielectric having a wound structure;

a first polarity terminal comprising a first conductive cover located on a first end of the wound structure, the first conductive cover electrically connected to the first polarity metallized surface at the first end of the wound structure, the second polarity metallized surface spaced apart from the first end of the wound structure and electrically isolated from the first conductive cover;

a second polarity terminal comprising a second conductive cover located on a second end of the wound structure, the second conductive cover electrically connected to the second polarity metallized surface at the second end of the wound structure, the first polarity metallized surface spaced apart from the second end of the wound structure and electrically isolated from the second conductive cover;

a first conductive shield comprising a first band covering a side surface of the wound structure, the first conductive shield comprising a first bent tab electrically connected to the first conductive cover; and a second conductive shield comprising a second band disposed about the first band of the first conductive shield, the second conductive shield electrically isolated from the first conductive shield and comprising a second bent tab electrically connected to the second conductive cover.

25. The capacitor element as set forth in claim 24, wherein the dielectric comprises a first dielectric sheet comprising the first polarity metallized surface on a surface of the first dielectric sheet, and a second dielectric sheet comprising the second polarity metallized surface on a surface of the second dielectric sheet.

\* \* \* \* \*